United States Patent
Niu et al.

(10) Patent No.: US 12,519,484 B2
(45) Date of Patent: *Jan. 6, 2026

(54) SEMANTIC BASED HUFFMAN ENCODING METHOD, SEMANTIC BASED HUFFMAN DECODING METHOD, AND RELATED DEVICE

(71) Applicant: Beijing University of Posts and Telecommunications, Beijing (CN)

(72) Inventors: Kai Niu, Beijing (CN); Jin Xu, Beijing (CN); Zijian Liang, Beijing (CN); Ping Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,293

(22) Filed: Aug. 5, 2024

(65) Prior Publication Data

US 2025/0240030 A1    Jul. 24, 2025

(30) Foreign Application Priority Data

Jan. 22, 2024 (CN) .......................... 202410090669.8

(51) Int. Cl.
*H03M 7/40* (2006.01)

(52) U.S. Cl.
CPC .................................. *H03M 7/40* (2013.01)

(58) Field of Classification Search
CPC ...................................................... H03M 7/40
USPC ................................................... 375/295
See application file for complete search history.

(56) References Cited

U.S. PATENT DOCUMENTS

2016/0093311 A1\* 3/2016 Kim ..................... G10L 19/038
381/22

\* cited by examiner

*Primary Examiner* — Dominic D Saltarelli
(74) *Attorney, Agent, or Firm* — Westbridge IP LLC

(57) ABSTRACT

Disclosed are a semantic based Huffman encoding method, a semantic based Huffman decoding method and related devices. In the semantic based Huffman encoding method, an information sequence containing source symbols is received at first. Then, synonymous mappings are performed on the source symbols respectively based on a synonymous mapping codebook. Later, synonymous sets corresponding to the source symbols are determined respectively. Further, encoded codewords corresponding to the synonymous sets are determined respectively based on a semantic Huffman codebook. After sorting the encoded codewords according to an order of the source symbols in the information sequence to obtain an encoded sequence corresponding to the information sequence, the encoded sequence is transmitted to a receiving end for decoding.

9 Claims, 4 Drawing Sheets

SEMANTIC BASED HUFFMAN ENCODING METHOD, SEMANTIC BASED HUFFMAN DECODING METHOD, AND RELATED DEVICE

CROSS-REFERENCE TO RELATED APPLICATIONS

This application claims priority to Chinese Patent Application No. 202410090669.8, filed on Jan. 22, 2024, the content of which is incorporated herein by reference in its entirety.

TECHNICAL FIELD

The present disclosure relates to communication technology, and in particular to a semantic based Huffman encoding method, a semantic based Huffman decoding method and related devices.

BACKGROUND

With an increasing demand for ultra-high speed transmissions in future communication scenarios, how to compress information efficiently and transmit large amounts of data reliably has become a research focus in current communication technologies. However, due to the fact that a description of information in classical information theory is based on symbolic probability, i.e. syntactic information, a theoretical limit of source coding compression corresponds to a compression limit of syntactic information. At the compression limit, it is impossible to further improve the compression efficiency of the source coding, which limits developments of the communication technologies.

SUMMARY

Examples of the present disclosure provides a semantic based Huffman coding method applied to a transmitting end, which includes: receiving an information sequence containing source symbols sent by a source, performing synonymous mappings on the source symbols respectively based on a pre-constructed synonymous mapping codebook; determining synonymous sets corresponding to the source symbols respectively; determining encoded codewords corresponding to the synonymous sets respectively based on a pre-constructed semantic Huffman codebook; sorting the encoded codewords according to an order of the source symbols in the information sequence to obtain an encoded sequence corresponding to the information sequence; and transmitting the encoded sequence to a receiving end for decoding.

Examples of the present disclosure also provides a semantic based Huffman decoding method applied to a receiving end, which includes: in response to receiving an encoded sequence sent by a transmitting end, determining a synonymous set sequence containing synonymous sets corresponding to the encoded sequence based on a pre-constructed semantic Huffman codebook; extracting source symbols as target source symbols from the synonymous sets respectively; and sorting the target source symbols to obtain a decoded sequence corresponding to the encoded sequence according to an order of synonymous sets in the synonymous set sequence.

Examples of the present disclosure also provides a semantic based Huffman encoding device, which includes: a first determination module, a second determination module, an encoding module and a transmitting module.

The first determination module is configured to receive an information sequence containing source symbols sent by a source, perform synonymous mappings on the source symbols respectively based on a pre-constructed synonymous mapping codebook, and determine synonymous sets corresponding to the source symbols respectively.

The second determination module is configured to determine encoded codewords corresponding to the synonymous sets respectively based on a pre-constructed semantic Huffman codebook.

The encoding module is configured to sort the encoded codewords according to an order of the source symbols in the information sequence to obtain an encoded sequence corresponding to the information sequence.

The transmitting module is configured to transmit the encoded sequence to a receiving end for decoding.

Examples of the present disclosure also provides a semantic based Huffman decoding device, which includes: a third determination module, an extraction module and decoding module.

The third determination module is configured to receive an encoded sequence sent by a transmitting end, determine a synonymous set sequence containing synonymous sets corresponding to the encoded sequence based on a pre-constructed semantic Huffman codebook.

The extraction module is configured to extract source symbols as target source symbols from the synonymous sets respectively.

The decoding module is configured to sort the target source symbols according to an order of the synonymous sets in the synonymous set sequence to obtain a decoded sequence corresponding to the encoded sequence.

Examples of the present disclosure also provides an electronic device, which includes: a memory, a processor, and a computer program stored in the memory and executable on the processor. The processor executes the program to implement the semantic based Huffman encoding method or the semantic based Huffman decoding method described above.

Examples of the present disclosure also provide a non-transient computer-readable storage medium which stores computer instructions for causing a computer to execute the semantic based Huffman encoding method or the semantic based Huffman decoding method described above.

From the above, it can be seen that in the semantic based Huffman encoding method, the semantic based Huffman decoding method, and related devices provided by the present disclosure, after receiving an information sequence containing source symbols sent by a source, synonymous mappings can be performed on the source symbols based on a pre-constructed synonymous mapping codebook to determine synonymous sets corresponding to the source symbols. By associating each source symbol with a synonym set based on semantics, source symbols corresponding to a same synonym set may have a same semantics. Further, encoded codewords corresponding to the synonymous sets can be determined based on a pre-constructed semantic Huffman codebook, where each synonymous set corresponds to an encoded codeword. In other words, during the encoding process, each source symbol corresponding to a same synonymous set may correspond to a same encoded codeword. According to the order of the source symbols in the information sequence, the encoded codewords can be sorted to obtain the encoded sequence corresponding to the information sequence. The encoding method of encoding the synonymous sets rather than the source symbols can replace traditional Huffman encoding methods. Further, the semantic based Huffman encoding method disclosed can further compress the average code length of the encoded sequence effectively, which may further improve the compression efficiency during the encoding process, enhance the transmission efficiency of the encoded sequence, and further improve the efficiency of communication technologies. After receiving the encoded sequence, the receiving end may decode the encoded sequence to obtain a decoded sequence which may retain semantics of the information sequence. In this way, the transmission process may not be distorted.

BRIEF DESCRIPTION OF THE DRAWINGS

In order to describe technical solutions of the present application or related arts more clearly, accompanying drawings required for describing examples or the related art are introduced briefly in the following. Apparently, the accompanying drawings in the following descriptions only illustrate some examples of the present application, and those of ordinary skill in the art may still derive other drawings from these drawings without creative efforts.

DETAILED DESCRIPTION OF THE EMBODIMENTS

Figure 1:
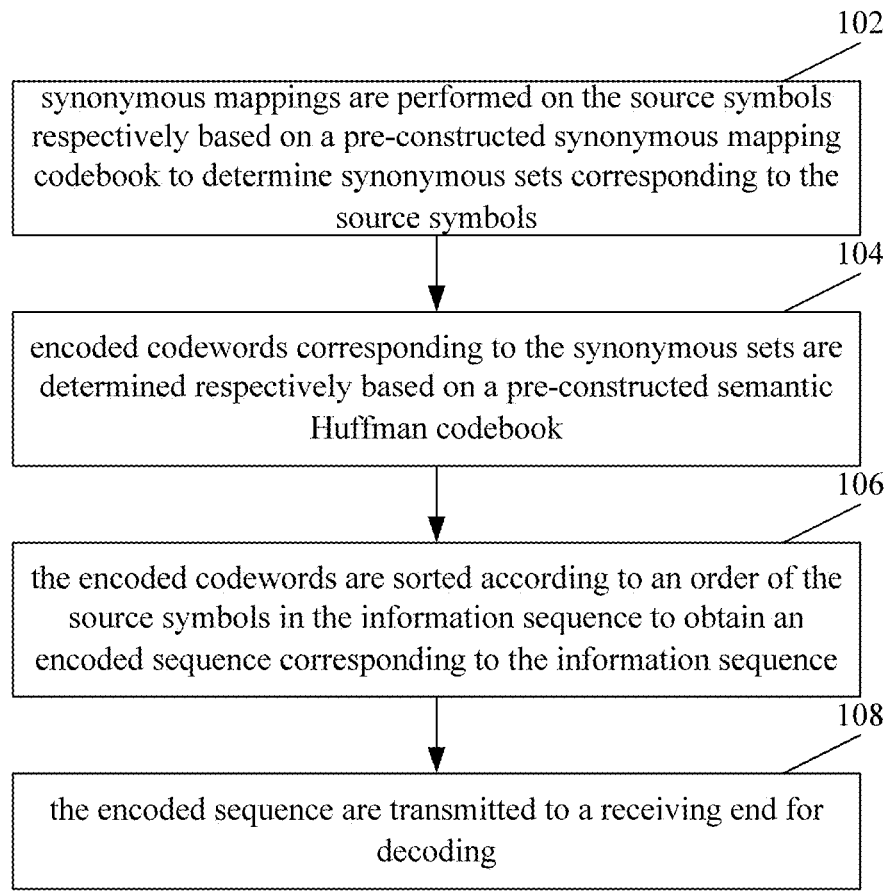
FIG. 1 is a schematic diagram of a semantic based Huffman encoding method according to examples of the present disclosure.

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

As mentioned in the background, with the increasing demand for an ultra-high speed transmission in future communication scenarios, how to compress information efficiently and transmit large amounts of data reliably has become a research focus in current communication technology. Shannon proposed a classical information theory in 1948. In the classical information theory, Shannon introduced a concept of entropy and proposed a theoretically achievable information compression limit, which is to reduce an average number of bits required for information transmission through encoding. Subsequently, numerous encoding schemes based on the classical information theory were designed and utilized.

Source coding technology is an important technique that supports efficient compression of information sources. The goal of lossless source coding is to reduce the storage or transmission requirements of data without losing original data information. The encoding method is typically applied in fields such as digital audio, images, or text. For lossless source coding of discrete sources, entropy coding method is commonly used. Entropy coding is a technique that encodes symbols based on the probability distribution, with a goal of obtaining shorter codes for symbols with higher probabilities of occurrence, thereby achieving an efficient compression of data. Among these entropy coding methods, Huffman coding is a special case of entropy coding. This algorithm is mainly used to encode characters or symbols according to their frequency of occurrence in data to be compressed, in order to achieve an efficient compression of data. Huffman coding achieves an efficient encoding of data by assigning shorter codes to frequently occurring symbols and longer codes to less frequently occurring symbols. The theoretical compression limit of traditional Huffman coding is Shannon entropy. For finite length messages, Huffman coding can usually reach the Shannon limit in practice.

With the development of semantic communication technology, an increasing number of studies have shown that in practical communication scenarios, semantic communication methods which utilize information in semantic domain can achieve more efficient source compression schemes than the existing source coding methods. The newly proposed semantic information theory describes a relationship between semantic information and syntactic information as a one to many relationships. Semantic source coding theorem developed based on the one to many relationships proves that using semantic source compression coding can obtain a more efficient source compression coding scheme than traditional source coding schemes. It indicates that introducing semantic information theory into source compression can further compress the source without affecting the reconstruction quality. Therefore, semantic Huffman coding based on semantic information theory has a higher compression efficiency than traditional Huffman coding and has a potential to become an important solution for efficient source compression problems.

In view of the above, examples of the present disclosure provide a semantic based Huffman encoding method and a semantic based Huffman decoding method, guided by the semantic information theory, which enables a transmitting end and a receiving end to obtain same synonymous sets, and construct relationships between semantics and syntax through the synonymous sets. In these examples, semantic Huffman codebooks can be constructed based on prior probabilities of different synonymous sets. The transmitting end may encode an information sequence containing source symbols based on the semantic Huffman codebook. The receiving end may decode an encoded symbol sequence based on the semantic Huffman codebook to obtain a decoded sequence.

It should be noted that binary encoding is generally used in source coding, so examples of the present disclosure mainly describe semantic Huffman coding based on binary encoding. If multilevel encoding is involved, brief changes can be made based on the examples of the present disclosure.

The following examples of the present disclosure will be described in detail with reference to accompanying drawings.

Examples of the present disclosure provides a semantic based Huffman coding method applied to a transmitting end. FIG. 1 is a schematic diagram of the semantic based Huffman encoding method according to examples of the present disclosure. As shown in FIG. 1, the semantic based Huffman encoding method may include the following steps.

In step 102, in response to receiving an information sequence containing source symbols sent by a source, synonymous mappings may be performed on the source symbols respectively based on a pre-constructed synonymous mapping codebook to determine synonymous sets corresponding to the source symbols respectively.

Specifically, a source is an entity that generates various types of information. The source symbol given by the source is uncertain and can be described by random variables and their statistical probabilities. Information is abstract, while the source is concrete. For example, when people talk, their vocal system is the source of speech. When people read books or newspapers, the illuminated books or newspapers are sources of text. Common sources of information may also include image sources, digital sources, and so on. After receiving an information sequence sent by the source, the transmitting end may need to perform a synonymous mapping on each source symbol in the information sequence. That is, source symbols with a same meaning may be mapped to a same synonymous set.

According to examples of the present disclosure, firstly, it is necessary to determine semantic information of each source symbol. Moreover, the semantic information of a source symbol may correspond to a synonymous set. In the above step, the semantic information of a source symbol may be compared with the semantic information of a synonymous set. If they are the same, the source symbol may be mapped to the synonymous set. To be noted, the synonymous mapping codebook may be pre-constructed, which specifies a one-to-one relationship between synonymous sets and the semantic information. Through the semantic information, a unique synonymous set corresponding to a source symbol can be determined.

In a specific example, the information sequence sent by the source can be denoted as $u=[u_1, \ldots, u_i \ldots, u_M]$, where, $u_i$ represents the $i^{th}$ source symbol and the length of the information sequence is M. In this step, each source symbol $u_i$ in the information sequence may be traversed, then a corresponding synonymous set $U_{i_s}$, $u_i \in U_{i_s}$ may be determined based on synonymous mapping. In this way, a synonymous set sequence $U_O=[U_1, \ldots, U_{i_s}, \ldots, U_M]$ with a sequence length of M may be obtained.

In step 104, encoded codewords corresponding to the synonymous sets may be determined respectively based on a pre-constructed semantic Huffman codebook.

In some examples of the present disclosure, the semantic Huffman codebook may be pre-constructed, which specifies a one-to-one relationship between synonymous sets and the encoded codewords. After determining the synonymous sets, the encoded codeword corresponding to each synonymous set can be determined according to the semantic Huffman codebook. In a specific example, the sequence of synonymous sets $U_O$ may be traversed, for each synonymous set $U_{i_s}$ in $U_O$, an encoded codeword bis may be determined based on the semantic Huffman codebook, and the mapping relationship can be denoted as $f:U_{i_s} \rightarrow b_{i_s}$.

In step 106, the encoded codewords may be sorted according to an order of the source symbols in the information sequence to obtain an encoded sequence corresponding to the information sequence.

After determining the encoded codewords corresponding to the synonymous sets, that is, determining the encoded codewords corresponding to the source symbols, the encoded codewords may be arranged in sequence according to the order of the source symbols in the information sequence to obtain the encoded sequence. That is, the encoded sequence b may be obtained by combining all the encoded codewords $b_{i_s}$ in order. In this way, the transmitting end completes encoding of the information sequence. Compared to traditional Huffman coding methods that encode the source symbols one by one, in examples of the present disclosure, the synonymous sets obtained by mapping the source symbols are encoded which can shorten the average code length, achieve a further compression of the encoded codewords, improve the compression efficiency of the encoding, and thus enhance the transmission efficiency of the encoded sequence.

In step 108, the encoded sequence may be transmitted to a receiving end for decoding.

After the transmitting end completes the encoding, the encoded sequence may be sent to the receiving end for decoding, resulting in a semantically undistorted decoded sequence.

In examples of the present disclosure, the decoding process is also based on the semantic Huffman codebook. The receiving end may read the encoded symbols in the encoded sequence one by one, traverse the encoded codewords contained in the semantic Huffman codebook, find the encoded codewords that are contained in the encoded sequence, and determine a corresponding synonymous set. The receiving end may then extract a source symbol from the synonymous set as a target symbol according to certain rules, and then combine all the target symbols in order to obtain a decoded sequence.

Based on the above steps 102 to 108, the semantic based Huffman encoding method provided by examples of the present disclosure may include the following steps. At first, an information sequence containing source symbols sent by a source is received. Then, synonymous mappings are performed on the source symbols based on a pre-constructed synonymous mapping codebook to determine synonymous sets corresponding to the source symbols respectively. In this way, the source symbols in the information sequence may be associated with synonym sets based on semantics respectively, where source symbols correspond to a same synonym set have a same semantics. Further, encoded codewords corresponding to the synonymous sets are determined based on a pre-constructed semantic Huffman codebook, where each synonymous set corresponds to an encoded codeword. In other words, during the encoding process, source symbols correspond to a same synonymous set may correspond to a same encoded codeword. Then, all encoded codewords are sorted according to the order of the source symbols in the information sequence to obtain an encoded sequence corresponding to the information sequence. The encoding method of encoding the synonymous sets may replace the traditional Huffman encoding methods, which can further compress the average code length of the encoded sequence, improve the compression efficiency during the encoding process, and thereby enhance the transmission efficiency of the encoded sequence. The method can further improve the efficiency of the communication technologies. After receiving the encoded sequence, the receiving end may decode the encoded sequence to obtain a decoded sequence which may retain semantics of the information sequence. In this way, the transmission process may not be distorted.

In some examples, performing synonymous mapping on the source symbols based on a pre-constructed synonymous mapping codebook to determine the synonymous sets corresponding to the source symbols respectively may include the following steps: for each source symbol, searching for a target synonymous set corresponding to the semantic information of the source symbol in the synonymous mapping codebook and taking the target synonymous set as the synonymous set corresponding to the source symbol. Where, in the synonymous mapping codebook, each semantic information has a one-to-one relationship with a synonymous set.

Specifically, in the above process, the semantic information of the source symbol is firstly determined. Then, the synonymous set corresponding to the semantic information of the source symbol may be searched for in the synonymous mapping codebook, and the synonymous set corresponding to the semantic information may be taken as the synonymous set corresponding to the source symbol. As stated above, the mapping relationship may be represented as $f:U_{i_s} \to b_{i_s}$. The semantic information has a one-to-one relationship with a synonymous set. Moreover, all source symbols corresponding to a same synonymous set may have same semantic information. As can be seen that, the encoding method can determine the synonymous sets corresponding to the source symbols quickly, therefore, improve the encoding efficiency.

In some examples of the present disclosure, before performing the synonymous mappings on the source symbols based on the pre-constructed synonymous mapping codebook, the above encoding method may further include: segmenting the information sequence according to a minimum symbol syntax unit of the source.

Specifically, before performing the synonymous mapping on the source symbols, it is necessary to segment the information sequence to obtain the source symbols. For example, if the information sequence is an English text, a minimum symbol syntax unit may be an English word. Then the English text may be divided into individual English words. Each English word may be treated as a source symbol. If the source information sequence is an irregular sequence of English letters, then the minimum symbol syntax unit may be the English letter. In this example, the English letter sequence may be divided into individual letters. Each letter may be treated as a source symbol. As can be seen that the encoding method disclosed can segment the information sequence effectively, which facilitates encoding of the information sequence.

In some examples of the present disclosure, the method for pre-constructing a synonymous mapping codebook may include the following steps: obtaining all source symbols of the source; grouping source symbols with a same semantic information into a synonymous set to classify the source symbols into multiple synonymous sets; and constructing the synonymous mapping codebook based on the relationships between the source symbols and the synonymous sets.

Specifically, when constructing the synonymous mapping codebook, it is necessary to obtain all the source symbols of the source and classify the source symbols into multiple synonymous sets according to the semantic information of the source symbols. To be noted, source symbols with a same semantic information may be divided into a synonymous set. That is, the source symbols contained in a synonymous set have the same semantic information. If a source symbol does not have other source symbols corresponding to the same semantic information, then the source symbol may be divided into a separate synonymous set. After dividing all the source symbols, a synonymous mapping codebook may be constructed based on the relationships between the source symbols and the synonymous sets. In examples of the present disclosure, a semantic knowledge database can be constructed based on existing databases, and then the source symbols can be classified based on the constructed semantic knowledge database. Specifically, for text sources, a synonym dictionary based on synonyms can be constructed for classification purposes. Specifically, different synonym construction methods can be used to construct entropy function synonym dictionaries for different sources and requirements.

Figure 2:
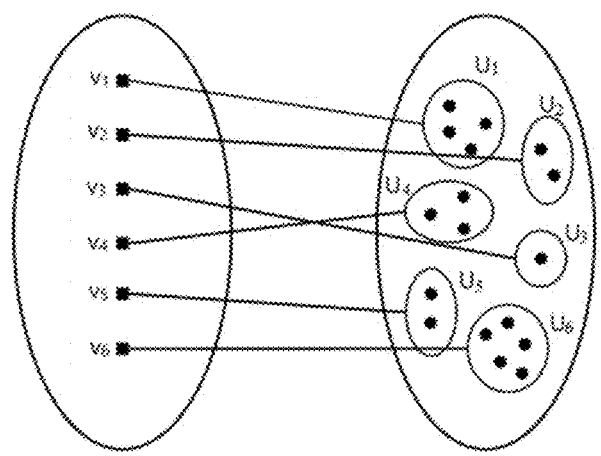
FIG. 2 is a schematic diagram illustrating a relationship between a semantic information space and a syntactic information space according to examples of the present disclosure.

FIG. 2 shows a relationship between a semantic information space and a syntactic information space. As shown in FIG. 2, the semantic information space may contain six different types of semantic information, including $v_1$, $v_2$, $v_3$, $v_4$, $v_5$, and $v_6$. The syntactic information space may contain six different synonymous subsets, including $U_1$, $U_2$, $U_3$, $U_4$, $U_5$, and $U_6$. Each synonymous subset may contain several source symbols, and each synonymous subset corresponds to a semantic information. Based on the semantic information, a mapping can be established between $v_1$ and $U_1$, $v_2$ and $U_2$, $v_3$ and $U_3$, $v_4$ and $U_4$, $v_5$ and $U_5$, $v_6$ and $U_6$.

In a specific example, all source symbols can be obtained from the source, and all the source symbols may be numbered and arranged to form a source symbol set $u_x = [u_{x1}, \ldots, U_{xi} \ldots, U_{xN_i}]$, where, $N_i$ represents the number of source symbols. Then, a synonymous set sequence U may be constructed, which contains multiple synonymous sets $U_{i_s}$, where, $i_s$ represents a sequence number of a synonymous set. The process of classifying all source symbols according to semantics may be as follows:

1) Initialize synonymous set sequence U as an empty sequence and initialize a variable j=1.
2) For the source symbol $u_{xj}$, traverse the synonymous set sequence U. If there is a synonymous set $U_{i_s}$ in the synonymous set sequence U with a same semantic information as the source symbol $u_{xi}$, add the source symbol $u_{xi}$ into the synonymous set $U_{i_s}$, and add 1 to the variable j.
3) If there is no synonymous set in U that has the same semantic information as the source symbol $u_{xi}$, assign the source symbol $u_{xi}$ to an empty synonymous set, place the synonymous set at the end of the synonymous set sequence U, and add 1 to the variable j.

4) Determine whether j is less than $N_i$. If j is less than $N_i$, return to step 2), otherwise end the process.

A classification of all source symbols may be done through steps 1) to 4). The length of the synonymous set sequence may be denoted as $N_{i_s}$. Each synonymous set contains at least one source symbol, and different synonymous sets do not intersect with others. The union of all synonymous sets may be the same as a set of all source symbols.

$$\forall i_s, U_{i_s} \neq \emptyset$$

$$\forall i_s \neq j_s, U_{i_s} \cap U_{j_s} \neq \emptyset$$

$$U_{i_s=1}^{N_{i_s}} U_{i_s} \neq \emptyset$$

Figure 3:
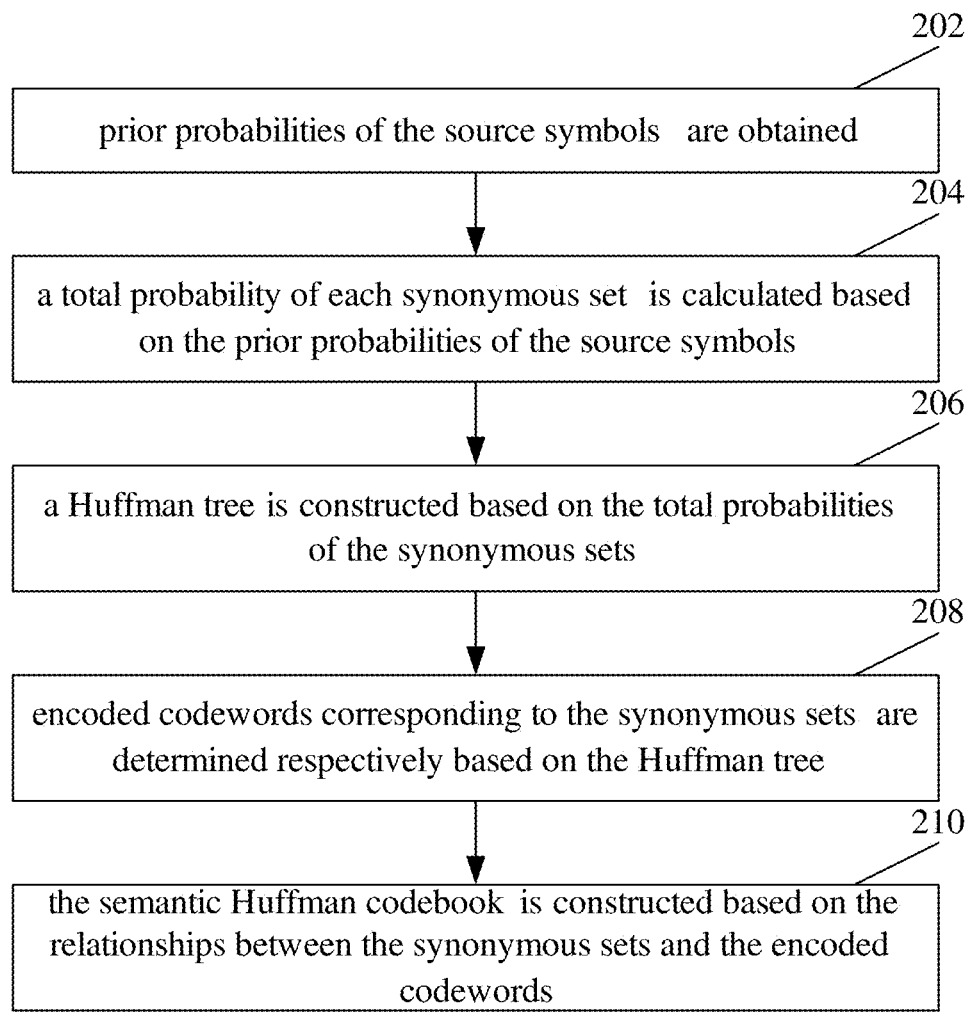
FIG. 3 is a schematic diagram illustrating a process of constructing a semantic Huffman codebook according to examples of the present disclosure.

Referring to FIG. 3, the method of pre-constructing the semantic Huffman codebook described above may include the following steps:

In step 202, prior probabilities of the source symbols may be obtained.

Specifically, the prior probabilities of the source symbols can be obtained through a statistical analysis. By conducting the statistical analysis on a large amount of data, the frequency of occurrence of each symbol in the source can be estimated. This method is suitable for situations where there are already a large number of samples, such as text, images, audio, etc. By statistically analyzing the data, a relative frequency of each source symbol can be obtained to estimate its probability distribution. In addition, in some cases, probability models can be used to fit the distribution of the source. For example, using Gaussian distribution, Poisson distribution, or other statistical models to describe the statistical probabilities of the source. After arranging all source symbols, the prior probability of the $i^{th}$ source symbol $u_{xi}$ may be denoted as $p(u_{xi})$.

Step 204, a total probability of each synonymous set may be calculated based on the prior probabilities of the source symbols.

In examples of the present disclosure, the total probability of a synonymous set may be calculated by the following steps: taking a sum of the prior probabilities of the source symbols contained in the synonymous set as the total probability of the synonymous set.

After determining the source symbols contained in the synonymous set, the prior probabilities of the source symbols are summed to obtain the total probability of the synonymous set, which is $p(U_{i_s}) = \Sigma_{i \in N_{i_s}} p(u_{xi})$.

In step 206, a Huffman tree may be constructed based on the total probabilities of the synonymous sets, taking the synonymous sets as leaf nodes.

Specifically, in step 206, each synonymous set may be taken as a leaf node of a Huffman tree. Then a Huffman tree construction method may be used to construct the Huffman tree. In this method, the leaf nodes may be sorted according to the total probabilities corresponding to these leaf nodes at first. Then, two leaf nodes with the smallest total probability may be selected and combined into a parent node. The total probability of the parent node is equal to a sum of the total probabilities of the two leaf nodes. Afterwards, the parent node and other unmerged leaf nodes may be sorted again according to the total probabilities corresponding to these leaf nodes and the parent node. Then, two nodes with the lowest total probability may be selected and combined into a new parent node. The total probability of the new parent node is equal to the sum of the total probabilities of the two nodes selected. Repeat this process until the total probability of the newly merged parent node is equal to 1, and this parent node serves as a root node of the Huffman tree. In this way, a Huffman tree may be formed.

Figure 4:
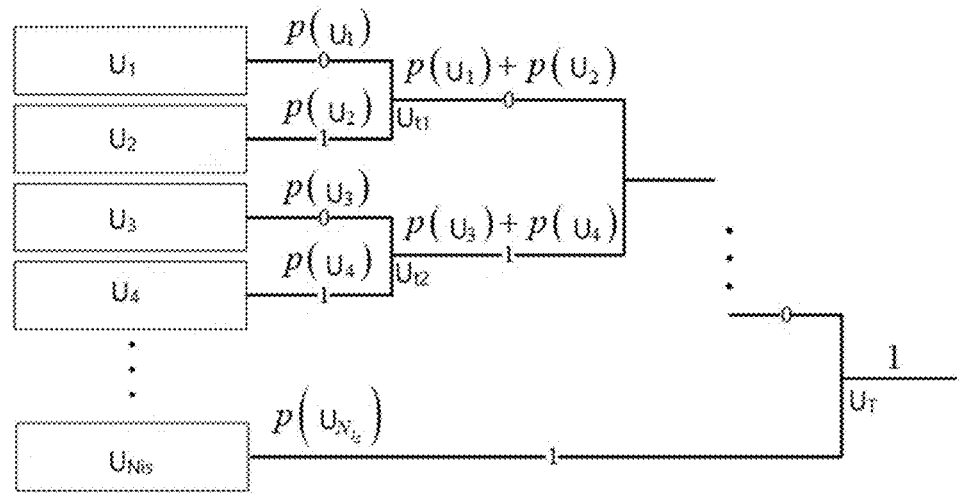
FIG. 4 is a schematic diagram illustrating a process of constructing a Huffman tree according to examples of the present disclosure.

FIG. 4 shows a schematic diagram illustrating the construction of a Huffman tree. As shown in FIG. 4, the synonymous set sequence U contains Nis synonymous sets, and each synonymous set may be taken as a leaf node of the Huffman tree. Firstly, the leaf nodes $U_1$ and $U_2$ with the minimum total probability may be selected, where the total probability of node $U_1$ is $p(U_1)$ and the total probability of node $U_2$ is $p(U_2)$. A parent node $U_{t_1}$ may be obtained by merging the leaf nodes $U_1$ and $U_2$, where the total probability of the parent node $U_{t_1}$ is $p(U_1)+p(U_2)$. Then, path symbols may be assigned to nodes $U_1$ and $U_2$, where node $U_1$ corresponds to a path symbol of 0 and node $U_2$ corresponds to a path symbol of 1. The principle for assigning path symbols is that the left branch corresponds to a path symbol of 0 (or 1), and the right branch corresponds to a path symbol of 1 (or 0). At this point, excluding leaf nodes $U_1$ and $U_2$, the two nodes with the minimum total probability are nodes $U_3$ and $U_4$. The total probability of node $U_3$ is $p(U_3)$, and the total probability of node $U_4$ is $p(U_4)$. A parent node $U_{t_2}$ may be obtained by merging the leaf nodes $U_3$ and $U_4$, where the total probability of the parent node $U_{t_2}$ is $p(U_3)+p(U_4)$. At this point, excluding leaf nodes $U_1$, $U_2$, $U_3$ and $U_4$, if the nodes with the minimum total probability are $U_{t_1}$ and $U_{t_2}$, a parent node may be obtained by merging the node $U_{t_1}$ and $U_{t_2}$. And so on, the root node Ur with a total probability of 1 may be obtained.

The process of constructing a Huffman tree can also be described through the following process.

1) Initialization of the Huffman tree.

2) Adding nodes in the Huffman tree.

Selecting two synonymous sets $U_{i_s}$ and $U_{j_s}$ with the lowest total probability in the synonymous set sequence U as two child nodes, where $i_s \neq j_s$. The two child nodes are then merged into one parent node, denoted as $U_t$. The total probability of the parent node $U_t$ is equal to $p(U_t)=p(U_{i_s})+p(U_{j_s})$. The child nodes $U_{i_s}$ and $U_{j_s}$, along with the parent node $U_t$, form a branch that can be inserted into the Huffman tree.

The specific insertion method may include: if the two child nodes $U_{i_s}$ and $U_{j_s}$ are already in the Huffman tree, the two child nodes $U_{i_s}$ and $U_{j_s}$ may be merged to generate the parent node $U_t$ towards the root in the Huffman tree; if one of the child nodes $U_{i_s}$ or $U_{j_s}$ is not in the Huffman tree, the non-existent node may be inserted as a leaf node of the Huffman tree, and then the two child nodes $U_{i_s}$ and $U_{j_s}$ may be merged to generate the parent node $U_t$ towards the root in the Huffman tree; if both of the two child nodes $U_{i_s}$ or $U_{j_s}$ are not in the Huffman tree, both the two child nodes $U_{i_s}$ or $U_{j_s}$ may be inserted as leaf nodes of the Huffman tree, and then the two child nodes $U_{i_s}$ and $U_{j_s}$ may be merged to generate the parent node $U_t$ towards the root in the Huffman tree.

3) Updating the synonym set sequence U.

Removing synonym sets corresponding to the two child nodes $U_{i_s}$ and $U_{j_s}$ from the synonym set sequence U, adding a synonym set corresponding to the parent node $U_t$ to the synonym set sequence U, and reordering all synonym sets contained in the synonym set sequence U according to the total probability of the synonym sets.

4) Returning to step 2) if there is more than one synonymous set left in the synonym set sequence U. Moreover, if there is only one synonymous set left in the synonym set sequence U, end the process and complete the construction of the Huffman tree.

In step 208, encoded codewords corresponding to the synonymous sets can be determined respectively based on the Huffman tree.

Figure 5:
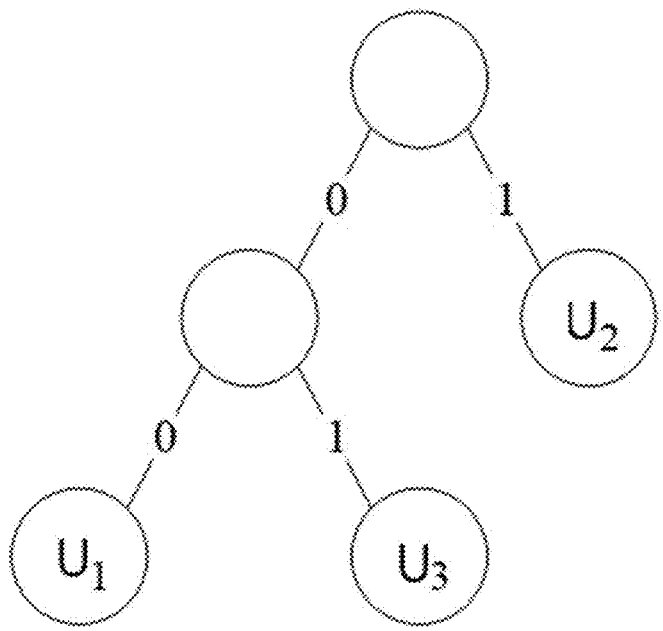
FIG. 5 is a schematic diagram illustrating a structure of a Huffman tree according to examples of the present disclosure.

FIG. 5 shows a schematic diagram of a structure of a Huffman tree. As shown in FIG. 5, the Huffman tree may include three synonymous sets, namely $U_1$, $U_2$, $U_3$. When determining the encoded codeword corresponding to the synonymous set $U_1$, starting from the root node of the Huffman tree and following the path shown in the diagram to reach the leaf node $U_1$, all the path symbols passed through are 00 in sequence, that is, the encoded codeword corresponding to the synonymous set $U_1$ is 00. Similarly, when determining the encoded codeword corresponding to the synonymous set $U_2$, all path symbols passed through are 1 in sequence, that is, the encoded codeword corresponding to the synonymous set $U_2$ is 1. When determining the encoded codeword corresponding to the synonymous set $U_3$, all path symbols passed through are 01 in sequence, that is, the encoded codeword corresponding to the synonymous set $U_3$ is 01. According to the method in this step, the encoded codeword corresponding to each synonymous set can be obtained respectively based on the Huffman tree.

It should be noted that the encoded codeword corresponding to the source symbols contained in one synonymous set is the encoded codeword corresponding to the synonymous set. In examples of the present disclosure, a Huffman tree is constructed based on the total probability of the synonymous sets. During the encoding process, encoding is performed on the synonymous sets rather than on the source symbols, which can effectively reduce the average code length of the encoded sequence and therefore improve the compression efficiency of the encoding process.

In step 210, the semantic Huffman codebook may be constructed based on the relationships between the synonymous sets and the encoded codewords.

After constructing the Huffman tree through the above steps, the encoded codeword of each synonymous set can be determined. Then, relationships can be formed between the synonymous sets and the encoded codewords, which may be stored in the semantic Huffman codebook. The semantic Huffman codebook facilitates a quick determination of the encoded codeword corresponding to a synonymous set in the future.

Figure 6:
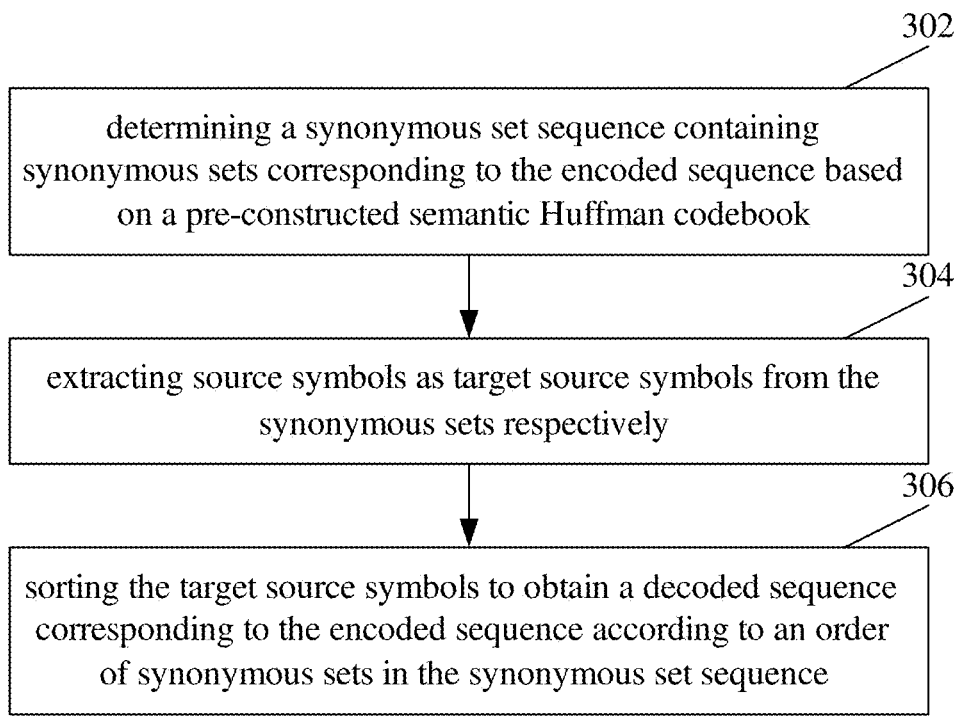
FIG. 6 is a schematic diagram of a semantic based Huffman decoding method according to examples of the present disclosure.

Examples of the present disclosure also provides a semantic based Huffman decoding method applied to a receiving end. FIG. 6 is a schematic diagram of the semantic based Huffman decoding method according to examples of the present disclosure. As shown in FIG. 6, the semantic based Huffman decoding method may include the following steps.

In step 302, in response to receiving an encoded sequence sent by a transmitting end, determining a synonymous set sequence containing synonymous sets corresponding to the encoded sequence based on a pre-constructed semantic Huffman codebook.

Specifically, after receiving the encoded sequence, encoded symbols in the encoded sequence are traversed. At the same time, the synonymous sets corresponding to the encoded symbols traversed can be determined based on the semantic Huffman codebook. All synonymous sets can be obtained then can be combined in a determined order to form a synonymous set sequence. To be noted, the construction method of the semantic Huffman codebook and synonymous sets in this step are the same as in previous examples, and will not be repeated here.

In step 304, extracting source symbols as target source symbols from the synonymous sets respectively.

Specifically, as stated above, source symbols in a same synonymous set may have a same semantic information. After determining the synonymous sets, for each synonymous set, extracting a source symbol from the synonymous set according to a preset extraction method can accurately represent the semantic information encoded in the encoded sequence. The preset extraction methods may include: a random selection, a fixed selection, or a maximum probability selection. Where, the fixed selection refers to selecting a given fixed symbol. The maximum probability selection refers to extracting based on the prior probability of each source symbol in the synonymous set. For example, selecting the source symbol with a highest probability. The specific extraction method is not limited in examples of the present disclosure.

In step 306, sorting the target source symbols to obtain a decoded sequence corresponding to the encoded sequence according to an order of synonymous sets in the synonymous set sequence.

Specifically, after extracting all the target source symbols according to the preset extraction method, the target source symbols may be sorted according to the order of the synonymous sets in the synonymous set sequence to obtain the corresponding decoded sequence. To be noted, the semantic information represented by the decoded sequence is the same as that of the information sequence.

In some examples of the present disclosure, the step of determining the synonymous set sequence corresponding to the encoded sequence based on a pre-constructed semantic Huffman codebook may include the following steps.

At first, encoded symbols in the encoded sequence are read one by one. For each encoded symbol in the encoded sequence, the synonymous set corresponding to the encoded symbols can be determined based on the semantic Huffman codebook. After determining the synonymous sets for all the encoded symbols in the encoded sequence, the synonymous sets may be sort to form the synonymous set sequence.

Specifically, each encoded symbol in the encoded sequence is read one by one, and a corresponding synonymous set can be determined for a couple of encoded symbols based on the pre-constructed semantic Huffman codebook. As stated above, each synonymous set corresponds to an encoded codeword, which may include one or several encoded symbols. For example, the encoded codeword corresponding to the synonymous set is Ue, which contains three encoded symbols 001, i.e. Ue=001. Furthermore, for the encoded symbols that have already been read, the semantic Huffman codebook may be used to find the encoded codeword composed of one or several encoded symbols, and then the synonymous set corresponding to the encoded codeword may be determined.

After reading is completed, the synonymous sets may be sort in a previously determined order to form a synonymous set sequence. In a decoding process, synonymous sets can be determined accordingly, which can ensure that the decoded sequence has the same semantic information as the encoded sequence.

In a specific example, the decoding process at the receiving end can also be described through the following process.

1) Initializing a decoding position identifier l=1 and initializing a sequence number $i_s$=1.
2) Starting from a $i^{th}$ encoded symbol of the encoded sequence b, searching along a path starting from the root node of the Huffman tree based on a value of the encoded symbol 0 or 1. To be noted, each time a node is moved, the decoding position identifier l may be incremented by 1 until a leaf node is found. Then, the decoding of a codeword is complete. The symbols 0 or 1 in the path passed may be arranged and combined in order to obtain an encoded codeword bis Based on the encoded codeword, a corresponding synonymous set $U_{i_s}$ can be determined through the semantic Huffman codebook, and the sequence number is may be incremented by 1.

3) Checking whether the decoding position identifier l reaches the length of the encoding sequence b. If the decoding position identifier l does not reach the length of the encoding sequence b, return to step 2). If the decoding position identifier l reaches the length of the encoding sequence b, the synonymous sets $U_{i_s}$ may be combined in sequence according to sequence number is to form the synonymous set sequence.

4) Selecting a source symbol $u_{xi}$ from each synonym set in the synonymous set sequence according to the preset extraction method as the target source symbol, and combining the target source symbols sequentially to obtain the decoded sequence c.

The encoding and decoding process of the present disclosure would be discussed in detail through specific examples.

In this example, there are 5 types of source symbols, and the corresponding prior probabilities are shown in Table 1. After calculation, the source entropy H is 2.1219 bits.

TABLE 1

Prior Probability of Source Symbol

| Source Symbol | Prior Probability |
| --- | --- |
| $u_1$ | 0.2 |
| $u_2$ | 0.4 |
| $u_3$ | 0.2 |
| $u_4$ | 0.1 |
| $u_5$ | 0.1 |

According to the traditional Huffman encoding method, a codebook can be constructed as shown in the following Table 2:

TABLE 2

Source Symbol Encoding

| Source Symbol | Codeword |
| --- | --- |
| $u_1$ | 010 |
| $u_2$ | 1 |
| $u_3$ | 011 |
| $u_4$ | 000 |
| $u_5$ | 001 |

The average code length calculated based on Table 2 is: $L_1=0.2\times3+0.4\times1+0.2\times3+0.1\times3+0.1\times3=2.2$ bit.

Given the following synonymous mappings: a first synonymous set $U_1=\{u_1\}$, a second synonymous set $U_2=\{u_2, u_3\}$, and a third synonymous set $U_3=\{u_4, u_5\}$. The prior probabilities of each synonymous sets are shown in Table 3:

TABLE 3

Prior Probabilities of Synonymous Sets

| Source Symbol | Synonymous Set | Prior Probability |
| --- | --- | --- |
| $u_1$ | $U_1$ | 0.2 |
| $u_2, u_3$ | $U_2$ | 0.6 |
| $u_4, u_5$ | $U_3$ | 0.2 |

According to the Huffman tree shown in FIG. 5, the encoded codeword corresponding to the synonymous sets are shown in Table 4:

TABLE 4

Encoded Codewords of Synonymous Sets

| Synonymous Set | Encoded Codeword |
| --- | --- |
| $U_1$ | 00 |
| $U_2$ | 1 |
| $U_3$ | 01 |

The average code length calculated based on Table 4 is: $L_2=0.2\times2+0.6\times1+0.2\times2=1.4$ bit, which is significantly shorter than $L_1$.

In an example, for a given information sequence [$u_1$ $u_3$ $u_2$ $u_2$ $u_5$ $u_2$ $u_1$ $u_3$ $u_4$ $u_2$], an encoded sequence according to a traditional Huffman coding method can be [0100111100110100110001], with a code length of 22 bits. However, the encoded sequence obtained by the semantic Huffman encoding according to examples of the present disclosure can be [00111011001011], with a code length of 14 bits. After decoding, the decoded sequence of the traditional Huffman encoding method can be [$u_1$ $u_3$ $u_2$ $u_2$ $u_5$ $u_2$ $u_1$ $u_3$ $u_4$ $u_2$], and the decoded sequence of the semantic Huffman encoding according to examples of the present disclosure can be [$u_1$ $u_2$ $u_3$ $u_3$ $u_4$ $u_2$ $u_1$ $u_2$ $u_4$ $u_3$]. It can be seen that the semantic Huffman coding has a higher compression efficiency compared to traditional Huffman coding, which can even break through the Shannon information entropy of the source due to additional information brought by synonymous sets. Although the decoded sequence of the semantic Huffman encoding may not necessarily perfectly match the information sequence emitted by the source, the two have the same semantic information according to the definition of synonymous sets, and therefore the differences do not affect a final transmission decision result. It can be seen that the semantic Huffman coding method and the semantic Huffman decoding method can significantly improve a compression efficiency of the source compared to traditional Huffman coding schemes, thus proving feasibilities and a high effectiveness of the semantic Huffman coding proposed by examples of the present disclosure.

It should be noted that the method of the present disclosure can be executed by a single device, such as a computer or a server. The method of present disclosure can also be applied to distributed scenarios, where multiple devices cooperate with each other to complete the task. In this distributed scenario, one device among these multiple devices can only perform one or more steps of the method described in examples of the present disclosure, and these multiple devices will interact with each other to complete the method.

It should be noted that some examples of the present disclosure have been described above. Other examples are within the scope of the appended claims. In some cases, the actions or steps described may be performed in a different order than in the examples described above and still achieve the desired results. In addition, the process depicted in the figures does not necessarily require a specific or continuous order to achieve the desired results. In some implementations, multitasking and parallel processing are also possible or may be advantageous.

Based on the same inventive concept and corresponding to any of the above examples, examples of the present disclosure also provide a semantic based Huffman encoding device, which can be applied to a transmitting end.

Figure 7:
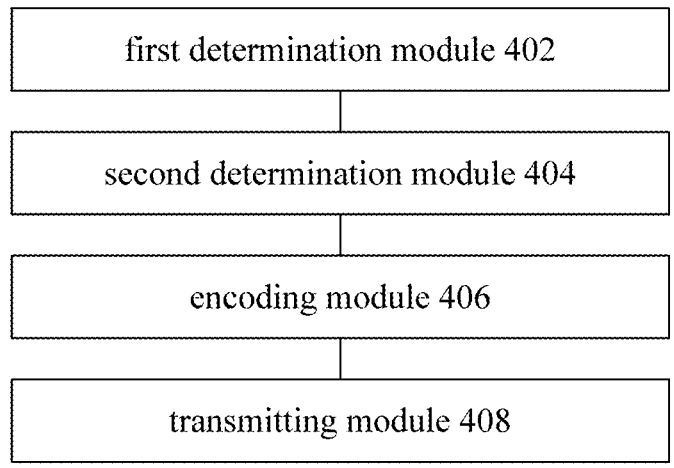
FIG. 7 is a schematic diagram of a semantic based Huffman encoding device according to examples of the present disclosure.

As shown in FIG. 7, the semantic based Huffman encoding device may include: a first determination module 402, a second determination module 404, an encoding module 406 and a transmitting module 408.

The first determination module 402 is configured to receive an information sequence containing source symbols sent by a source, perform synonymous mappings on the source symbols respectively based on a pre-constructed synonymous mapping codebook, and determine synonymous sets corresponding to the source symbols respectively.

The second determination module 404 is configured to determine encoded codewords corresponding to the synonymous sets respectively based on a pre-constructed semantic Huffman codebook;

The encoding module 406 is configured to sort the encoded codewords according to an order of the source symbols in the information sequence to obtain an encoded sequence corresponding to the information sequence.

The transmitting module 408 is configured to transmit the encoded sequence to a receiving end for decoding.

In some examples of the present disclosure, the first determination module 402 may be further configured to search for the synonymous set for each source symbol respectively in the synonymous mapping codebook based on semantic information of the source symbol; where, in the synonymous mapping codebook, a semantic information may have a one-to-one relationship with a synonymous set.

In some examples of the present disclosure, before performing synonymous mappings on the source symbols, the first determination module 402 may be further configured to segment the information sequence according to a minimum symbol syntax unit of the source.

In some examples of the present disclosure, the semantic based Huffman encoding device may further include: a construction module, configured to obtain source symbols of the source, classify the source symbols according to semantic information of the source symbols, combine source symbols with a same semantic information into a synonymous set, and construct the synonymous mapping codebook based on relationships between the source symbols and the synonymous set.

In some examples of the present disclosure, the construction module may be further configured to obtain prior probabilities of the source symbols, calculate total probabilities of the synonymous sets respectively based on the prior probabilities of the source symbols in each of the synonymous sets; taking the synonymous set as leaf nodes, constructing a Huffman tree based on the total probabilities of the synonymous sets, determine encoding codewords corresponding to the synonymous sets respectively based on the Huffman tree, and construct a semantic Huffman codebook based on relationships between the synonymous sets and the encoding codewords.

In some examples, the construction module may be further configured to take a sum of prior probabilities of source symbols contained in a synonymous set as the total probability of the synonymous set.

Based on the same inventive concept and corresponding to any of the above examples, examples of the present disclosure also provide a semantic based Huffman decoding device, which can be applied to a receiving end.

Figure 8:
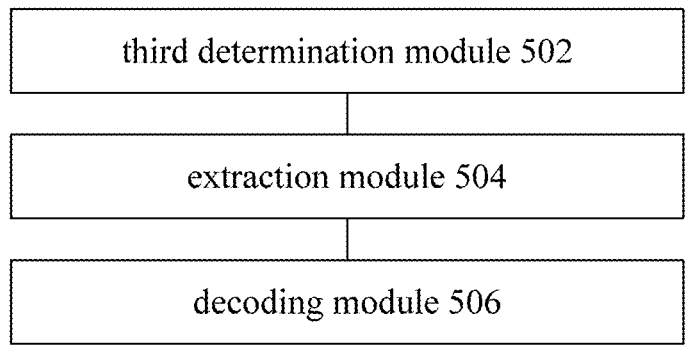
FIG. 8 is a schematic diagram of a semantic based Huffman decoding device according to examples of the present disclosure.

As shown in FIG. 8, the semantic based Huffman decoding device may include: a third determination module 502, an extraction module 504 and decoding module 506.

The third determination module 502 is configured to receive an encoded sequence sent by a transmitting end, determine a synonymous set sequence corresponding to the encoded sequence based on a pre-constructed semantic Huffman codebook.

The extraction module 504 is configured to extract source symbols as target source symbols from synonymous sets in the synonymous set sequence according to a predetermined extraction method.

The decoding module 506 is configured to sort the target source symbols according to an order of the synonymous sets in the synonymous set sequence to obtain a decoded sequence corresponding to the encoded sequence.

In some examples of the present disclosure, the third determination module 502 may be further configured to read encoded symbols in the encoding sequence one by one, determine synonymous sets corresponding to encode symbols based on the semantic Huffman codebook, and after a completion of reading the encoding sequence, sort the synonymous sets to form the synonymous set sequence.

For the convenience of description, the above devices can be divided into various modules based on their functions. Of course, the functions of each module can be implemented in the same or multiple software and/or hardware when implementing examples of the present disclosure.

The device of the above examples may be used to implement the corresponding semantic based Huffman encoding method or the semantic based Huffman decoding method in any of the above examples, and has the beneficial effects of the corresponding methods, which will not be repeated here.

Examples of the present disclosure also provides an electronic device, which includes a memory, a processor, and a computer program stored in the memory and executable on the processor, the processor executes the program to implement the semantic based Huffman encoding method or the semantic based Huffman decoding method.

Figure 9:
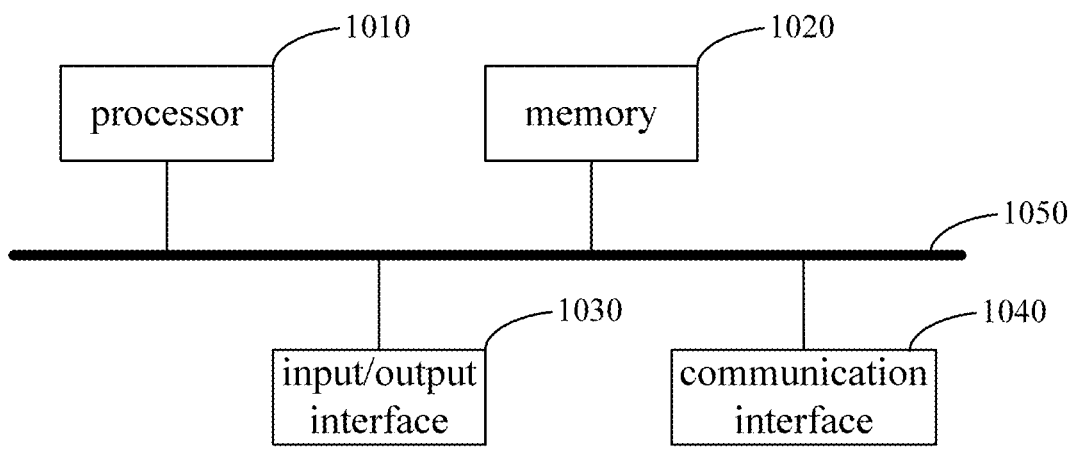
FIG. 9 is a schematic diagram illustrating a structure of an electronic device according to examples of the present disclosure.

FIG. 9 is a schematic diagram illustrating a structure of an electronic device according to some examples of the present disclosure. As shown in FIG. 7, the electronic device may include: a processor 1010, a memory 1020, an input/output interface 1030, a communication interface 1040, and a bus 1050. The processor 1010, the memory 1020, the input/output interface 1030, and the communication interface 1040 may couple to each other via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures. When the technical solution provided by the example of the description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The above-mentioned device of the present disclosure is used to realize the semantic based Huffman encoding method or the semantic based Huffman decoding method in accordance with any of the above examples, and has the beneficial effects of the corresponding method, which will not be repeated here.

Based on a same inventive concept, examples of the present disclosure also provide a non-transitory computer-readable storage medium, which stores a computer instruction. The computer instruction is used to make a computer execute the semantic based Huffman encoding method or the semantic based Huffman decoding method in accordance with any of the above examples.

The computer-readable storage medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

Based on a same inventive concept of the semantic based Huffman encoding method or the semantic based Huffman decoding method described in any of the above examples, the present disclosure also provides a computer program, which includes computer instructions. In some examples, the computer instructions may be executed by one or more processors of a computer to enable the computer and/or processor to execute the 1 semantic based Huffman encoding method or the semantic based Huffman decoding method. Corresponding to the execution subject of each step in examples of the semantic based Huffman encoding method or the semantic based Huffman decoding method, the processor executing the corresponding step can belong to the corresponding execution subject.

The computer program of the above example is used to enable the computer and/or processor to execute a semantic based Huffman encoding method or a semantic based Huffman decoding method as described in any one of the above examples, and has the beneficial effects of corresponding methods, which will not be repeated here.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A semantic based Huffman encoding method, applied to a transmitting end, comprising:
    receiving an information sequence containing source symbols sent by a source;
    performing synonymous mappings on the source symbols respectively based on a synonymous mapping codebook to determine synonymous sets corresponding to the source symbols;

determining encoded codewords corresponding to the synonymous sets based on a semantic Huffman codebook;

sorting the encoded codewords according to an order of the source symbols in the information sequence to obtain an encoded sequence corresponding to the information sequence; and transmitting the encoded sequence to a receiving end for decoding.

2. The semantic based Huffman encoding method according to claim 1, wherein, performing synonymous mappings on the source symbols respectively based on a synonymous mapping codebook to determine synonymous sets corresponding to the source symbols comprises:

for each source symbol, searching for a target synonymous set corresponding to semantic information of the source symbol in the synonymous mapping codebook; and taking the target synonymous set as the synonymous set corresponding to the source symbol; wherein, in the synonymous mapping codebook, each semantic information has a one-to-one relationship with a synonymous set.

3. The semantic based Huffman encoding method according to claim 1, further comprising:

segmenting the information sequence according to a minimum symbol syntax unit of the source.

4. The semantic based Huffman encoding method according to claim 1, further comprising:

obtaining all source symbols of the source;

grouping source symbols with a same semantic information into a synonymous set to classify the source symbols into multiple synonymous sets; and constructing the synonymous mapping codebook based on relationships between the source symbols and the synonymous sets.

5. The semantic based Huffman encoding method according to claim 1, further comprising:

obtaining prior probabilities of the source symbols;

calculating a total probability of each synonymous set based on the prior probabilities of the source symbols;

constructing a Huffman tree based on the total probabilities of the synonymous sets by taking the synonymous sets as leaf nodes;

determining encoded codewords corresponding to the synonymous sets respectively based on the Huffman tree; and constructing the semantic Huffman codebook based on relationships between the synonymous sets and the encoded codewords.

6. The semantic based Huffman encoding method according to claim 5, wherein, calculating a total probability of each synonymous set based on the prior probabilities of the source symbols comprises: for each synonymous set, taking a sum of the prior probabilities of the source symbols contained in the synonymous set as the total probability of the synonymous set.

7. A semantic based Huffman decoding method applied to a receiving end, comprising:

receiving an encoded sequence sent by a transmitting end;

determining a synonymous set sequence containing synonymous sets corresponding to the encoded sequence based on a semantic Huffman codebook;

extracting source symbols as target source symbols from each of the synonymous sets respectively; and sorting the target source symbols to obtain a decoded sequence corresponding to the encoded sequence according to an order of the synonymous sets in the synonymous set sequence.

8. The semantic based Huffman decoding method, wherein, determining a synonymous set sequence comprises:

reading encoded symbols in the encoded sequence one by one;

for each encoded symbol in the encoded sequence, determining the synonymous set corresponding to the encoded symbol based on the semantic Huffman codebook; and after determining the synonymous sets for all the encoded symbols in the encoded sequence, sorting the synonymous sets according to an order of the encoded symbols in the encoded sequence to form the synonymous set sequence.

9. An electronic device, comprising a memory, a processor, and a computer program stored in the memory and executable on the processor, wherein the processor executes the computer program to implement the method according to claim 1.

* * * * *